Sept. 3, 1929. C. L. T. EDWARDS 1,727,100
BLAST FURNACE
Filed Oct. 23, 1924
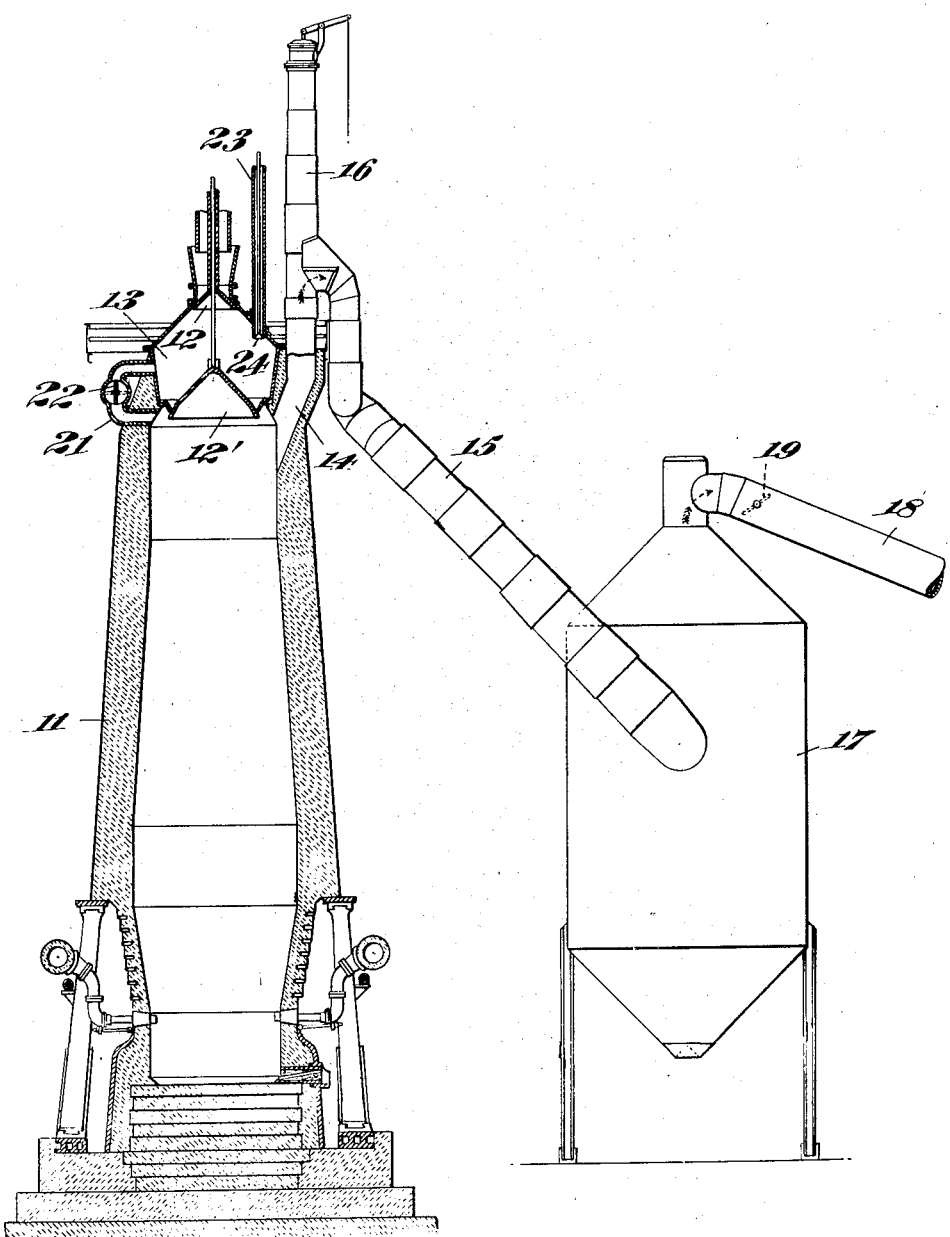
INVENTOR
Charles L. T. Edwards.
BY
and
ATTORNEYS Patented Sept. 3, 1929.

1,727,100

UNITED STATES PATENT OFFICE.

CHARLES L. T. EDWARDS, OF LEBANON, PENNSYLVANIA, ASSIGNOR TO BETHLEHEM STEEL COMPANY.

BLAST FURNACE.

Application filed October 23, 1924. Serial No. 745,274.

This invention relates to blast furnaces and more particularly to an improvement in the art of smelting ferro alloys.

My invention has for an object to increase the furnace output and improve the quality of the product without increasing the consumption of fuel and flux.

A further object of my invention is to utilize low grade ores hitherto considered unsuitable for the purpose, and to reduce the customary losses of metal through excessive slag absorption or through volatilization.

A further object of my invention is to increase the thermal efficiency of the furnace by a more effective use of the heat available in the hearth and a reduction in the top heats of the furnace.

It is well known that the furnace conditions obtained in the smelting of ferro alloys are substantially different from those usual in the manufacture of pig iron. In the smelting of ferro manganese, for example, reduction of the oxides of manganese is effected below the furnace bosh and requires 2984 B. t. u. as compared with the 2430 B. t. u required for the reduction of the corresponding oxides of iron, an increase therefore of about 20% in the case of manganese. The carbon requirement for reduction is, however, two or three times that of iron oxide, while the tapping temperature of ferro manganese is substantially lower than that of pig iron. From the above it will be evident that the greater heat requirement for the reduction of manganese will result in the lowering of the hearth temperature usual in a pig iron furnace. It may in fact be so lowered as to fall short of the critical temperature at which a maximum separation of the metallic constituents of the ore can be effected. This hearth temperature cannot be raised to the critical temperature by increasing the fuel ratio, in fact, any attempt to increase this ration would operate disadvantageously to the process, as the consequent increase in slag formation would aggravate the loss of manganese through absorption by the slag.

These conditions have led me to consider the best means of increasing the mass action in the furnace. In accodance with the law of mass action, it is known that the degree of interaction between reactive bodies is a function of their mass and their reactivity. It is likewise known that the degree of gas absorption in a liquid is dependent on the imposed pressure. From these considerations, I have deduced that an increase in mass action in a furnace can be effected by any one of the following methods:

(1) By increasing the volume of the blast,
(2) By reducing the amount of feebly reactive material present as for example, lime and silica,
(3) By increasing the internal pressure of the furnace.

Of these methods, I have found that the last named, viz, an increase in furnace pressure, offers the greater advantages in furnace economy and is the most readily applicable.

An increase in furnace pressure for the purpose of augmenting mass action is cumulative in effect. The sum of the various reactions effected in the blast furnace results in a balance on the exothermic side, which balance is increased by the greater activity of the reactive constituents of the charge, effected by augmented mass action, said augmented mass action being produced by the higher density of gas resulting from the increased furnace pressure. The higher exothermic balance thus obtained favors the development of higher hearth temperatures.

These higher hearth temperatures permit of a reduction in the quantity of flux and consequently a decreased slag volume without impairing the separation of the desired metallic constituents of the ore. With less slag present there is less loss of metal through absorption by the slag and this fact tends to contribute to the further development of hearth temperature. The ability to operate with less slag obviously results in an economy in fuel and flux.

I have also found that due to the higher hearth temperature I obtain in my furnace, the ratio of $CO$ and $CO_2$ gases hitherto developed in a blast furnace is decreased. While this entails some loss in calorific value per unit of volume of the gas, the total volume of the gas is substantially increased. In other words, assuming for the sake of example, a blast furnace having in its upper zone a capacity of 1000 cubic feet gas under 13½ lbs. barometric pressure and at 700° C. If this pressure be increased to 18 lbs. per square inch, the melting zone of the furnace will be lowered and consequently the temperature of the gas in the upper zone will be less. If this altered temperature be, for example, 500° C. it is evident that under the altered conditions of pressure and temperature, the original volume under consideration, viz, 1000 cubic feet of gas will be substantially reduced. Taking into consideration the well known relationship of volume pressure and temperature as expressed by the formula $$\frac{VP}{T} = \frac{V'P'}{T'},$$

I find that in the example I have cited, the gas originally occupying a volume of 1000 cubic feet will under the altered conditions of increased pressure and reduced temperature occupy only 595 cubic feet. In other words, the capacity of the upper zone of the furnace would thereby be increased 68%.

This greater capacity in the upper zone of my furnace admits of my altering the conditions of the blast to suit the specific ferro alloy I intend to manufacture. For example, I can increase the blast volume without changing the velocity of combustion gases through the furnace, and conversely I can decrease their velocity without changing the blast volume. Obviously an increase in blast volume will tend to accelerate the development of the desired hearth temperatures and consequently lessen the radiation losses. In practice I prefer to effect a compromise between these two extremes, by a moderate increase in the blast volume, maintaining the velocity through the furnace unaltered, at the same time I utilize a part of the increased capacity of my furnace to accommodate a greater ore burden.

In order to effect these several improvements in the blast furnace art as hitherto practiced by increasing the furnace pressure, I throttle the furnace gases in such a manner as to induce a substantial back pressure on the furnace. This throttling of the gases can be effected in several ways, for example, by a constriction of the orifice area in the gas outlet, or by the use of valves in the downcomer. I am aware that it is old to interpose valves in a plurality of downcomers from a blast furnace for the purpose of insuring an even distribution of heat in the furnace and to avoid "hot spots" by adjusting the said valves for the removal of variable quantities of furnace gases. The use of such valves has however never been contemplated for the purpose of substantially increasing the pressure throughout the furnace so as to augment the mass action in the charge. Moreover, the mere interposition of a valve or valves in the furnace outlets will not achieve the objects I have disclosed, because of the repeated loss in furnace pressure due to the lowering of successive charges through the furnace top.

Of the several ways in which I can practice my invention I prefer to use a pivoted valve of the well known butterfly type, such a valve being readily adjusted and controlled to suit the varying conditions of operation in my furnace. This valve may be placed at any point in a furnace downcomer, or at the gas outlet of a dust catcher, or at any suitable point in a gas main. I prefer to place it at the outlet of the dust catcher, so as not to obstruct the free passage in the downcomer, of the flue dust entrained by the furnace gases.

When operating a blast furnace under the pressure conditions disclosed in my invention, it is necessary to provide a means for loading successive charges to the furnace without loss of pressure due to the opening of the furnace top. The loading device usual in a blast furnace is a double bell and hopper consisting of a top bell and a bottom bell, operable separately and enclosing between them a loading space. To avoid loss of pressure and facilitate charging it is necessary to equalize the pressures on either side of the bottom bell before lowering same from its seating. It is also necessary to relieve the pressure in the bell space before opening the top bell. I, therefore, provide a suitable pressure equalizer and a pressure release to operate in conjunction with the back pressure or throttling valve of my furnace.

In the drawing, I show an elevation in part section of a blast furnace communicating with a dust catcher. I show a blast furnace of usual construction with a double bell and hopper loader, having a top bell (12), a bottom bell (12') and a bell space (13). I also show an outlet (14), a downcomer (15) and a valved bleeder (16). The downcomer communicates with a dust catcher (17) having a gas outlet (18) communicating with gas scrubbers or with a gas main. In the gas outlet (18) I show a butterfly valve (19) capable of being controlled in any suitable manner.

I provide a by-pass connection (21) and a by-pass valve (22) to communicate pressure from the furnace (11) to the bell space (13). I also provide a pressure relief pipe (23) and a valve (24) to vent the bell space (13) when desired.

To operate my furnace I partially close the valve (19) thereby inducing a back pressure on the furnace. When it is desired to lower the bottom bell (12') in order to drop a fresh charge into the furnace, I equalize the pressures in the furnace (11) and the bell space (13) by opening the by-pass valve (22). When the lower bell has been raised to its closing position and before lowering the upper bell (12) to admit a fresh charge to the bell space (13) I release the pressure in the bell space by opening the relief valve (24).

Comparative tests made between the normal method of operating a 500 ton blast furnace with the outlet for the furnace gas unrestricted and the method herein disclosed have clearly demonstrated the advantages of my method. It has also been demonstrated in practice that the mere increase of the blast volume without control of the outlet area for the combustion gas gives unsatisfactory results, such as high flue dust losses amounting, for example, to 575 pounds per ton of iron, an increase in fuel ratio and a daily tonnage lower than that obtained by operation with a normal volume of blast. On the other hand, with the volume of blast increased and the furnace gas outlet partially closed, the flue dust loss is substantially reduced as, for example, to 289 pounds per ton of iron, the fuel ratio is lowered and the tonnage may be increased to 552 tons.

From these tests it is evident that, a very substantial improvement in blast furnace practice may be attained by the combination of an augmented volume of blast and the escape of the combustion gases under suitable control, such as may be effected by an adjustable valve in the gas flue. For practical reasons, I have found it advisable to throttle the gas at a point, where there is no danger of flue dust accumulating in the flue, and I, therefore, allow the gas to pass through a dust collector before reaching the point at which its free passage is to be restricted.

While I have shown and described my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art, or as are specifically set forth in the appended claims.

Having thus described the invention what I claim as new and desire to secure by Letters Patent is:

1. In the reduction of ores in a blast furnace, the step of increasing the furnace pressure by imposing back pressure thereupon maintaining said increased pressure without opposing the free escape of solids entrained by the combustion gases.

2. An improvement in the art of operating a blast furnace for the production of ferro alloys, whereby the normal furnace losses of the alloying element may be substantially diminished, which consists in decreasing the normal proportion of flux in the furnace charge, and in increasing the normal hearth temperature of the furnace by throttling the free escape of the furnace gases after removal of the suspended solids therefrom.

3. An improvement in the art of smelting ores in a blast furnace which consists in augmenting the normal volume of the blast, and reducing a corresponding increase in the normal velocity of the combustion gases passing from the furnace, without opposing the free escape of solids entrained thereby.

4. The method of developing high hearth temperatures in an ore smelting furnace which consists in, charging the furnace with ore, flux and coke blowing air through the heated furnace charge, removing the solids entrained by the furnace gases and controlling the velocity of said gases after the solids have been removed therefrom.

5. An improvement in the art of smelting ores in a blast furnace, which consists in increasing the normal volume of the air to a predetermined degree, removing the solids entrained by the combustion gas, and inducing a degree of back pressure in the system by controlling the escape of gas from which said solids have been removed.

6. In a blast furnace associated with a dust collector, the method of increasing the normal capacity of the furnace which consists in, blowing air through the furnace charge, said air being in greater volume than is normally used, and in throttling the passage of the combustion gases from the dust collector so as to modify the increase in velocity of said gases due to the increase in volume of the air blast.

In testimony whereof I hereunto affix my signature this 15th day of October, 1924.

CHARLES L. T. EDWARDS.